United States Patent [19]
Ditton

[11] Patent Number: 5,974,981
[45] Date of Patent: Nov. 2, 1999

[54] PALLET FOR SHIPPING AND DE-SPOOLING ELECTRICAL WIRE

[75] Inventor: Louis G. Ditton, Fort Wayne, Ind.

[73] Assignee: Essex Group, Inc., Fort Wayne, Ind.

[21] Appl. No.: 08/967,633

[22] Filed: Nov. 10, 1997

[51] Int. Cl.⁶ .................................................. B65D 19/44
[52] U.S. Cl. .................................................. 108/55.3
[58] Field of Search .................. 108/55.3, 55.1, 108/53.1, 51.11; 206/408, 384, 398, 386

[56] References Cited

U.S. PATENT DOCUMENTS

| | | | |
|---|---|---|---|
| 3,993,168 | 11/1976 | Kubick | 108/55.3 X |
| 4,263,855 | 4/1981 | Lawlor | 108/55.3 X |
| 4,413,737 | 11/1983 | Wind | 108/53.1 X |
| 4,516,677 | 5/1985 | Rowland et al. | 108/53.1 X |
| 4,664,260 | 5/1987 | Stokes | 108/53.1 X |
| 4,735,321 | 4/1988 | Day | 108/55.3 X |
| 5,025,735 | 6/1991 | Chann et al. | |
| 5,144,897 | 9/1992 | Avery | 108/55.3 |
| 5,390,789 | 2/1995 | Darby | |

FOREIGN PATENT DOCUMENTS 2224993   5/1990   United Kingdom .................. 108/55.3

*Primary Examiner*—Jose V. Chen
*Attorney, Agent, or Firm*—Rader, Fishman & Grauer PLLC

[57] ABSTRACT

A pallet assembly for transporting and de-spooling electrical wire packaged in different forms (on reels or in boxes and pails) is disclosed. The pallet assembly comprises a base and a first layer cover. The base has a number of depressions formed in its top surface, each capable of receiving packages having different cross sectional profiles (circular, square, rectangular, etc.). The first layer cover has a number of locator bosses extending downward from its bottom surface. While being shipped, the packages are secured in the depressions on the top surface of the base, and the first layer cover is disposed above the packages so that the locator bosses engage the packages. In addition, the pallet assembly may contain tubular shrouds for de-spooling wire reels directly off the pallet. All components of the pallet assembly are made from a thermoplastic material and are reusable.

27 Claims, 7 Drawing Sheets

PALLET FOR SHIPPING AND DE-SPOOLING ELECTRICAL WIRE

FIELD OF INVENTION

This invention pertains to a pallet assembly for transporting electrical wire.

BACKGROUND OF THE INVENTION

In the past, makers of electrical wire have shipped products to their customers using wooden pallets. Typically, the wire manufacturer would ship individual reels of wound wire in corrugated boxes. The wire maker would stack the corrugated boxes on pallets and then tie them down to prevent movement during transportation. High volume customers, such as electric motor manufacturers, would then remove the reels from the boxes prior to de-spooling. This unpacking process wasted time and resources since the customers discarded the wooden pallets and corrugated boxes. Although wire distributors normally did not unpack individual reels, they nevertheless had to dispose of the wooden pallets.

To conserve resources, wire manufacturers began shipping wire on reels without corrugated boxes. They stacked the wire reels on pallets, and to prevent movement during transportation, placed at various points on the wooden pallet locator tabs that engage flanges on the reels. Although this shipping method lessened disposal problems associated with corrugated boxes, the user still had to dispose of the wooden pallet. To help solve this problem, some wire manufacturers began shipping wire on reusable molded plastic pallets. Like their wood counterparts, plastic pallets also employed various schemes to locate and secure the wire reels during transportation.

Though the use of reusable molded plastic pallets and the practice of shipping wire on reels without corrugated boxes have reduced waste disposal problems, other problems remain. For example, high volume customers cannot simply de-spool wire directly off the pallet. Instead, they must place individual reels in de-spooling shrouds to prevent the wire from whipping during the unwinding process. In addition, because reels are made in many different sizes, the placement of locator tabs and other structures to secure the reels during shipment varies depending upon the reel type. Thus, a wire manufacturer cannot normally use one pallet design to ship different types of reels. Moreover, a wire maker cannot use a pallet designed for shipping reels to a high volume user to ship wire contained in boxes or pails to a distributor. This proliferation of pallet designs has led to increased shipping costs for wire manufacturers.

Thus, an objective of the invention is to provide a reusable pallet assembly for transporting electrical wire that does not use wood or corrugated paper. Another objective of the invention is to provide a single pallet assembly for shipping wire contained on reels of many sizes. Still another objective of the invention is to provide a single pallet assembly that wire manufactures can use to ship wire on reels to high volume customers, and can also use to ship wire contained in boxes and pails to distributors. A further objective of the invention is to provide a pallet assembly that makers of wire can use to ship wire, and that customers can use to de-spool wire directly off the pallet.

SUMMARY OF THE INVENTION

In accordance with one aspect of the present invention, there is provided a pallet assembly for transporting and de-spooling packages containing electrical wire. The pallet assembly comprises a base and a first layer cover. The base has a number of depressions formed in its top surface, each capable of receiving packages having different shapes. The first layer cover has a number of locator bosses extending downward from its bottom surface. While being shipped, the packages are secured in the depressions on the top surface of the base, and the first layer cover is disposed above the packages so that the locator bosses engage the packages.

In accordance with a second aspect of the present invention, there is provided a pallet assembly for transporting and de-spooling reels containing electrical wire. The pallet assembly comprises a base, a first layer cover, and a plurality of de-spooling shrouds. The base has a number of depressions formed on its top surface for receiving the reels. Each de-spooling shroud is in the form of a tube. One end of each shroud is inserted into the depressions in the base, and the other end of each shroud supports the first layer cover. The reels are contained within cavities formed by the intersection of the de-spooling shrouds with the top surface of the base and with the first layer cover.

In accordance with a third aspect of the present invention, there is provided a pallet assembly for transporting and de-spooling packages containing electrical wire comprising a base, an assembly cover, and one or more separator panels. The packages are stacked in layers between the base and the assembly cover, and the separator panels are selectively disposed between the layers of packages such that the packages are secured in depressions located on the base and in receptacles formed on the top surface of each separator panel. In addition, the packages are engaged by locator bosses on the bottom surfaces of the assembly cover and each separator panel.

DETAILED DESCRIPTION OF THE PREFERRED EMBODIMENTS

Figure 1:
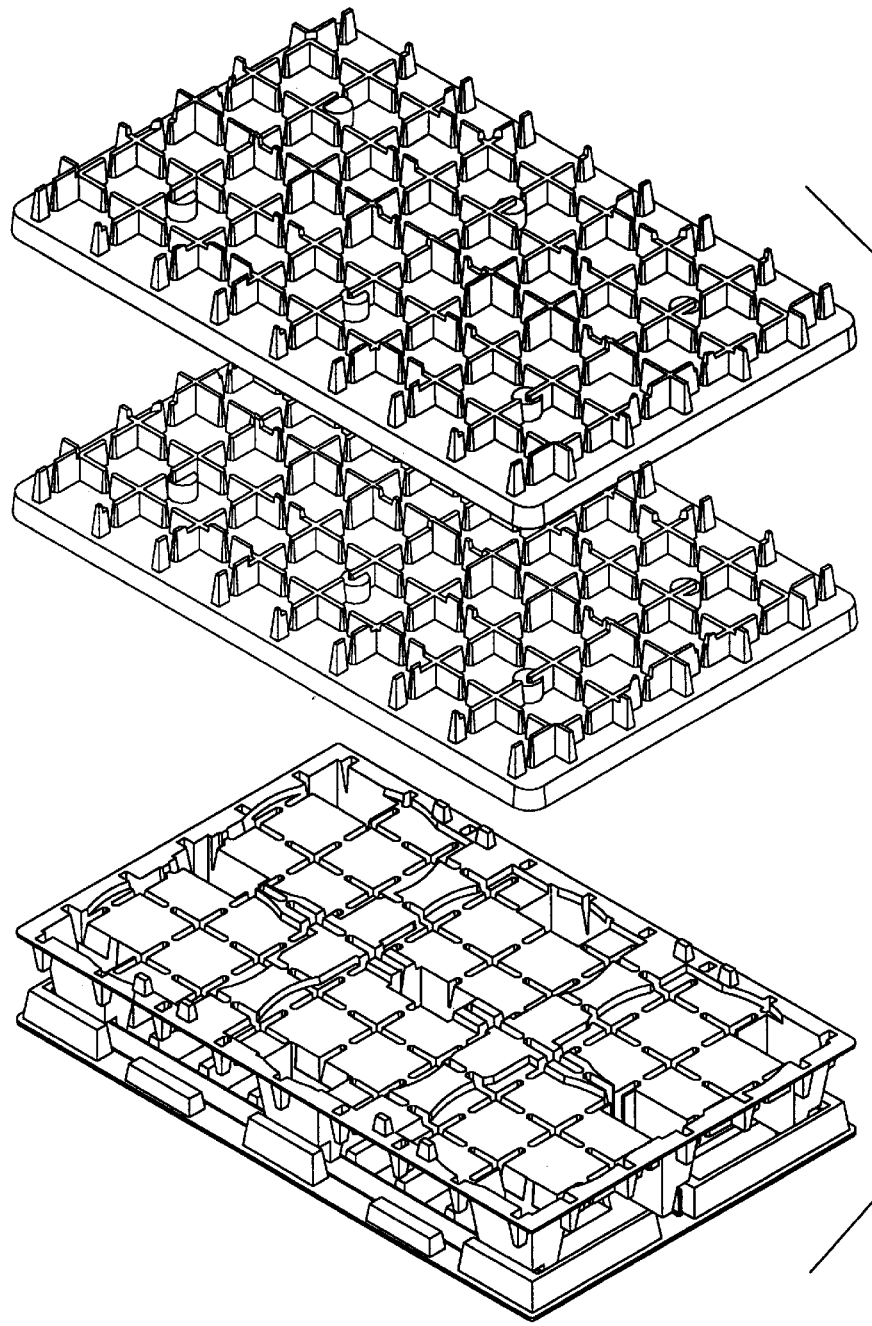
FIG. 1 shows a perspective view of a pallet assembly.

FIG. 1 shows a perspective view of a first embodiment of a pallet assembly 10. The pallet assembly 10 comprises a base 12, a first layer cover 14, and a second layer cover 16. The pallet assembly 10 is designed to transport electrical wire packaged in many different forms including reels, boxes and pails (not shown). The pallet assembly 10 includes four channels 18 formed in the base 12 (two running from the left side to the right side of the base 12, and two running from the front to the back of the base 12) that are designed to receive the forks of a conventional forklift truck. These channels 18 provide a means for lifting and transporting the loaded pallet assembly 10.

Figure 2:
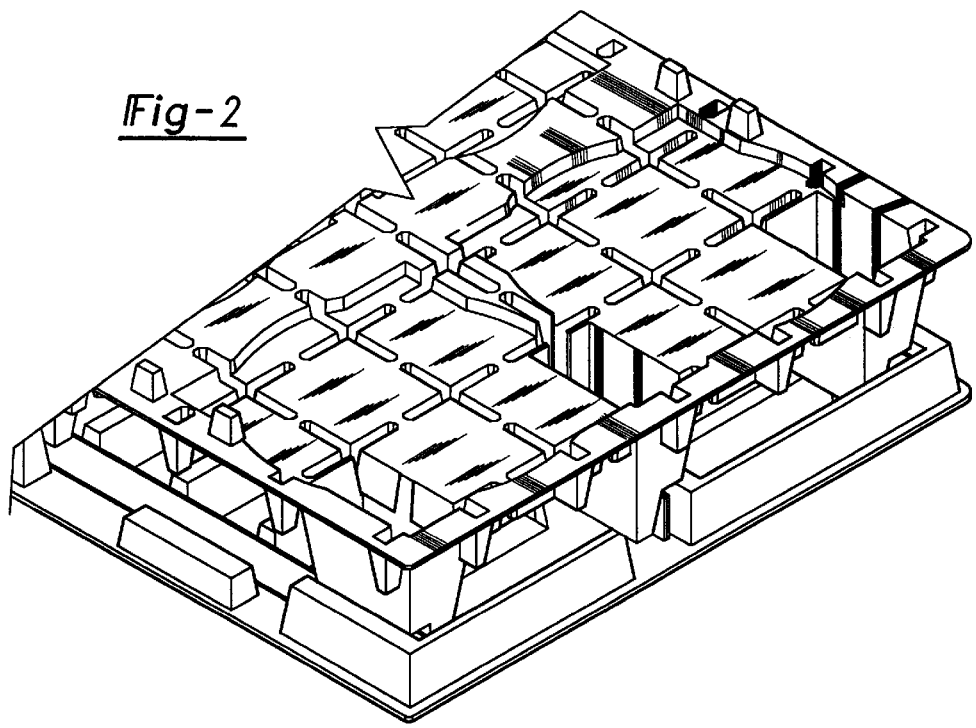
FIG. 2 shows a close-up, perspective view of a top surface of a base.

FIG. 2 shows a close-up, perspective view of the base 12. A top surface 20 of the base 12 contains a plurality of depressions 22 for receiving the packages (not shown). In order to accommodate packages having both circular and square cross sections, the perimeter of the depressions 22 have discontinuous and spaced apart arcuate 24 and corner 26 pieces. The base is made from high density polyethylene (HDPE), though any polymeric material having the requisite mechanical strength can be used (including reinforced elastomers and rubber modified thermoplastics). The base 12 shown in FIG. 2 was vacuum formed from a top sheet 28 and a bottom sheet 30 of HDPE. Cross-like projections 32 and ribs 34 are formed in the respective top 28 and bottom 30 sheets, which provide additional strength and rigidity. The top sheet 28 is disposed on the bottom sheet 30 by means of pillars 36 formed along the edge and in the center of the top sheet 28. The two sheets 28, 30 are heat welded together at the interface between the pillars 36 and the bottom sheet 30, forming a unitary base 12.

Figure 3A:
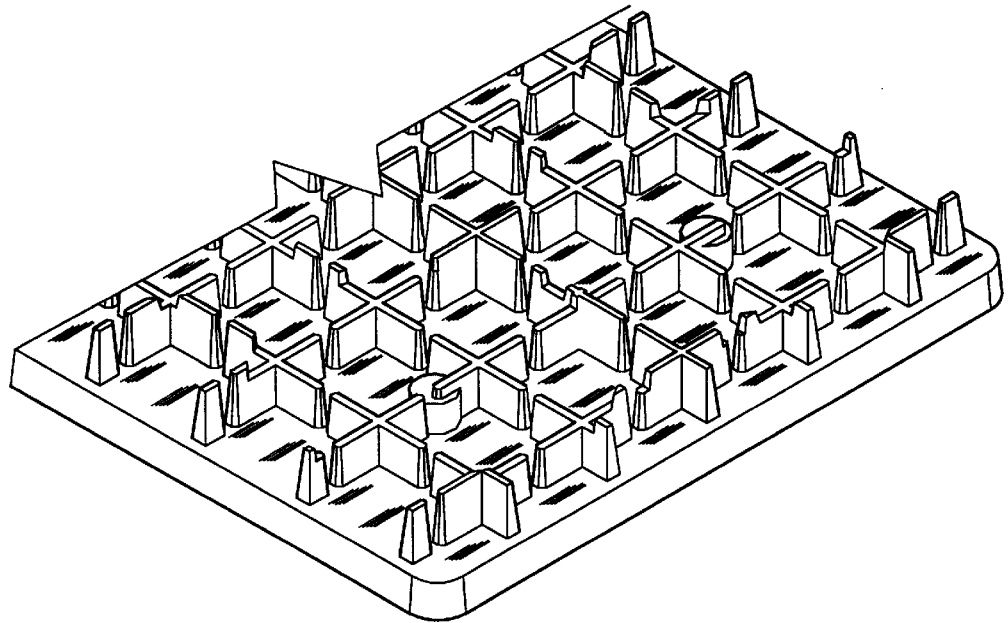
FIG. 3A shows a perspective view of a top surface of a first layer cover.
Figure 3B:
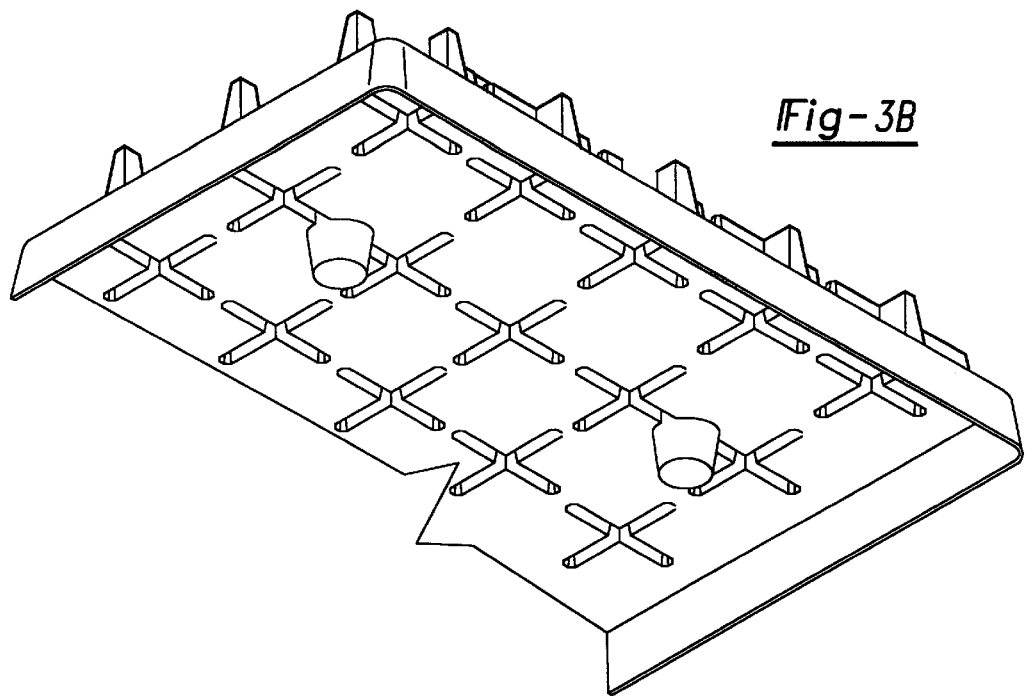
FIG. 3B shows a perspective view of a bottom surface of a first layer cover.

FIGS. 3A and 3B show perspective views of a top 38 and a bottom surface 40 of the first layer cover 14, respectively. The first layer cover is made from HDPE, though any polymeric material having the requisite mechanical strength can be used. An array of first 42 and second projections 44 extend upward from the top surface 38 of the first layer cover 14. The first 42 and second projections 44 have similar shape, although the first projections 42 are taller than the second projections 44.

These cross-like projections 42, 44 serve two purposes. Like the projections 32 on the base 12, they provide additional strength and rigidity. In addition, by grouping the (shorter) second projections 44 in discrete regions, the first 42 and second projections 44 define depressions or receptacles 46 on the top surface 38 of the first layer cover 14 for receiving packages. Since the (taller) first projections 42 bordering the second projections 44 are spaced apart, the receptacles 46 are able to contain packages having many different cross sectional profiles (circular, square, rectangular, etc.).

The bottom surface 40 of the first layer cover 14 contains a plurality of protrusions or locator bosses 48 that extend downward. In the embodiment shown in FIG. 3B, the locator bosses 48 are arranged so that when the first layer cover 14 is disposed above the base 12, the locator bosses 48 are in substantial alignment with the centers of the base depressions 22.

Figure 4A:
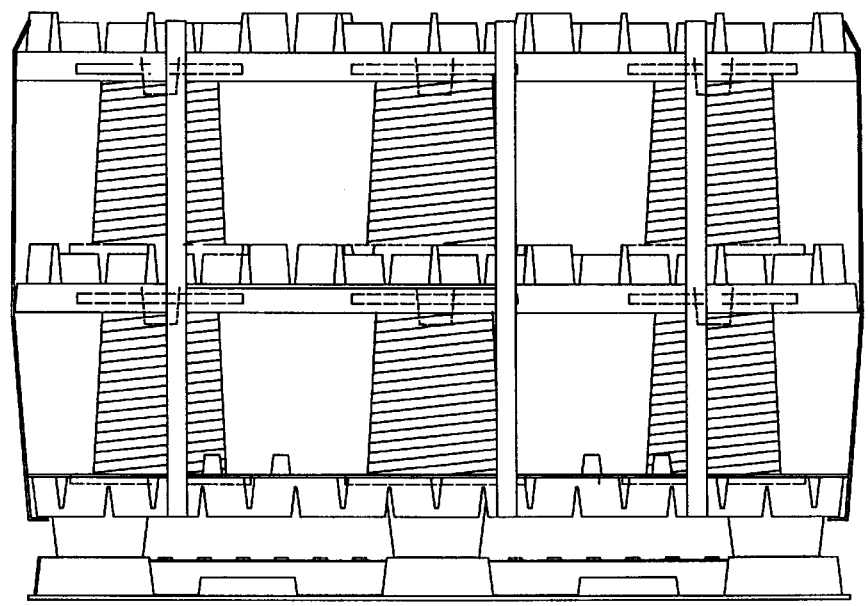
FIG. 4A shows a front view of a pallet assembly containing reels of electrical wire.
Figure 4B:
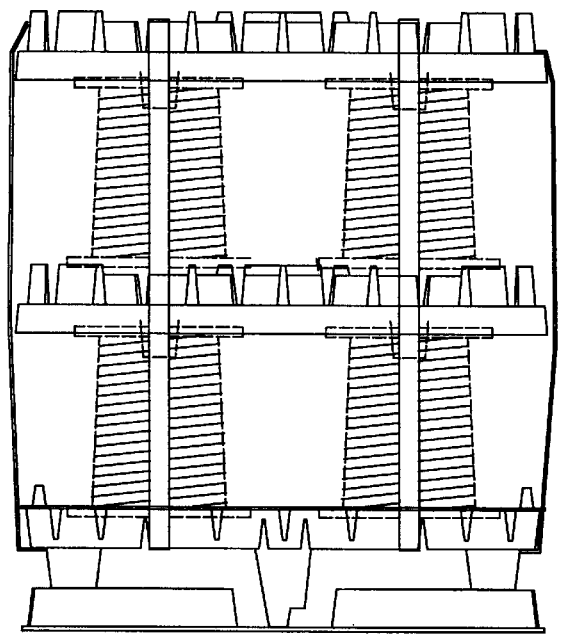
FIG. 4B shows a side view of a pallet assembly containing reels of electrical wire.

FIGS. 4A and 4B show front and side views, respectively, of the pallet assembly 10 containing reels 50 of electrical wire. The reels 50 consist of hollow tubes having circular end flanges. The embodiment shows a first layer 52 and a second layer 54 of reels 50, 6 reels 50 in each layer 52, 54. The bottom flanges of the six reels 50 comprising the first layer 52 are placed in the 6 depressions 22 in base 12. The first layer cover 14 is disposed on the top flanges of the first layer reels 52 such that the locator bosses 48 (shown by dotted lines) engage the hollow tubes of the reels 50. The bottom flanges of the six reels 50 comprising the second layer 54 are placed in the 6 receptacles 46 on the first layer cover 14. The second layer cover 16, which is substantially the same as the first layer cover 14, is disposed on the top flanges of the second layer reels 54 such that locator bosses 56 engage the hollow tubes of the reels 50. Bands 58 secure the pallet assembly 10 during shipment. Following shipment, the user returns the base 12 and the first 14 and second layer 16 covers to the wire manufacturer for reuse.

Figure 4C:
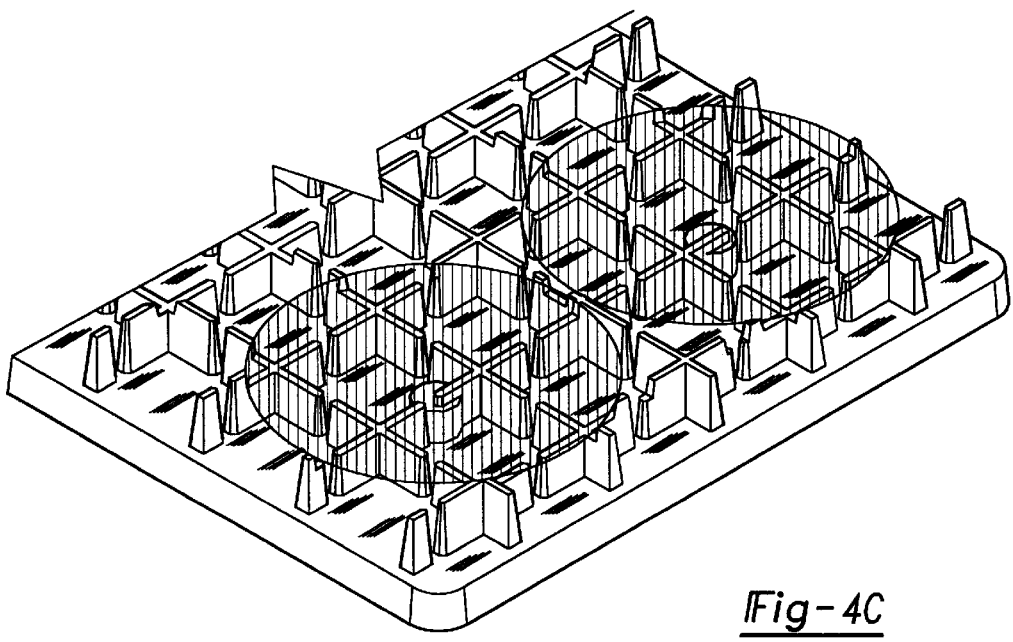
FIG. 4C shows a perspective view of receptacles formed on a top surface of a first layer cover, and the placement of reels in the receptacles.

The placement of the reels 50 can be seen more clearly in FIG. 4C, which shows a close-up, perspective view of the first layer cover 14. Shaded circles 60 in FIG. 4C represent cross-sections of the reel 50 flanges at a reference plane located above and parallel to the first layer cover 14.

Figure 5A:
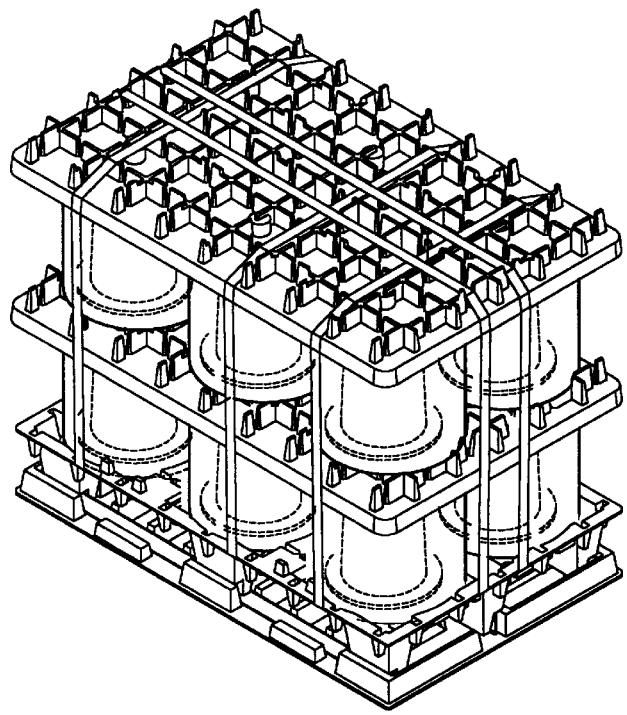
FIG. 5A shows a perspective view of a pallet assembly with de-spooling shrouds.
Figure 5B:
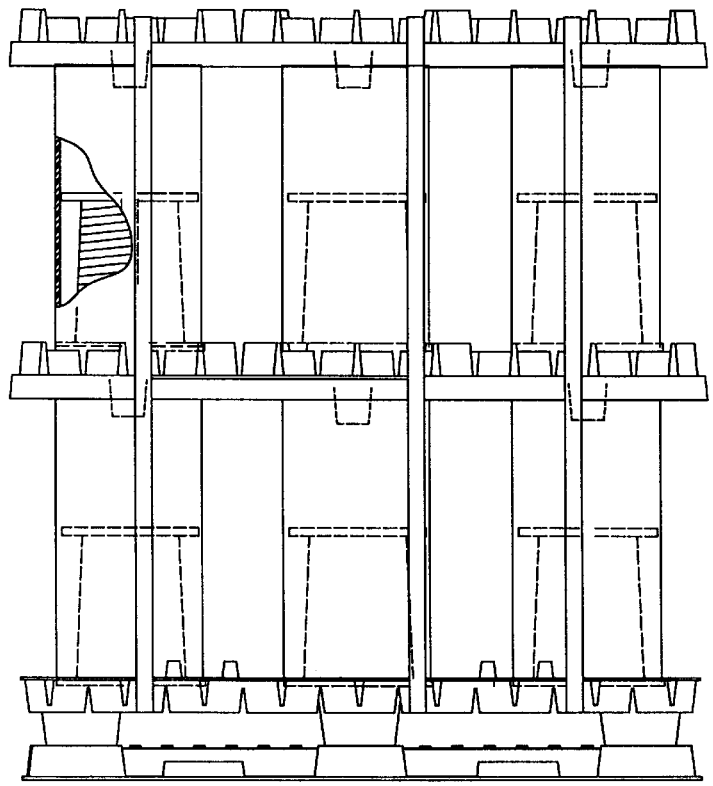
FIG. 5B shows a front view of a pallet assembly with de-spooling shrouds.

FIGS. 5A and 5B show a prospective view and a front view, respectively, of a second embodiment of the pallet assembly 62. The second embodiment comprises a base 64, a first layer cover 66, a second layer cover 68, and de-spooling shrouds 70 (shown in phantom in FIGS. 5A and 5B). The base 64, and the first 66 and the second layer 68 covers are substantially the same as in the first embodiment. De-spooling shrouds 70, which are absent in the first embodiment, allows for reels 72 of electrical wire to be de-spooled directly off the pallet assembly 62. In the embodiment shown, the de-spooling shrouds 70 are in the form of cylindrical tubes and are made from HDPE, though any material having sufficient strength and rigidity may be used.

The second embodiment includes a first 74 and a second layer 76 of reels 72, 6 reels in each layer 74, 76. The bottom flanges of the six reels 72 comprising the first layer 74 are placed in the 6 depressions 78 on the base 64, and the bottom flanges of the 6 reels 72 comprising the second layer 76 are placed in the 6 receptacles 80 on the first layer cover 66. De-spooling shrouds 70 are placed around each of the reels 72 in both layers 74, 76. Because the de-spooling shrouds 70 are taller than the reels 72, the first 66 and the second layer 68 covers rest on the top ends of the de-spooling shrouds 70. (Generally, one may adjust the height of the de-spooling shrouds 70 so that the first 66 and second layer 68 covers rest on the top ends of the de-spooling shrouds 70, and the locator bosses 82, 84 on the first 66 and second layer 68 covers, respectively, engage the reels 72.) Bands 86 secure the pallet assembly 62 during shipment.

To de-spool directly off the pallet assembly 62, the user severs the bands 86 and removes the second layer cover 68. Each reel 72 in the second layer 76 is then unwound while still within its respective de-spooling shroud 70. After all the reels 72 in the second (top) layer 76 have been de-spooled, the first layer cover 66 is removed and the process repeated for each reel 72 in the first (bottom) layer 74. After de-spooling, the user returns the de-spooling shrouds 70 (along with the base 64 and the first 66 and the second layer 68 covers) to the wire manufacturer for reuse.

Figure 6A:
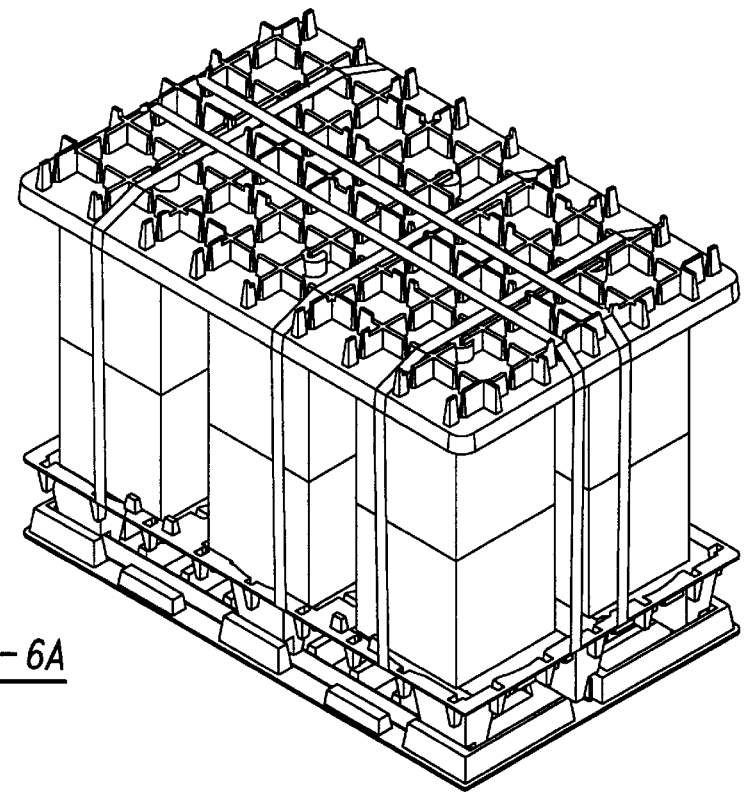
FIG. 6A shows a perspective view of a pallet assembly holding boxes containing electrical wire.
Figure 6B:
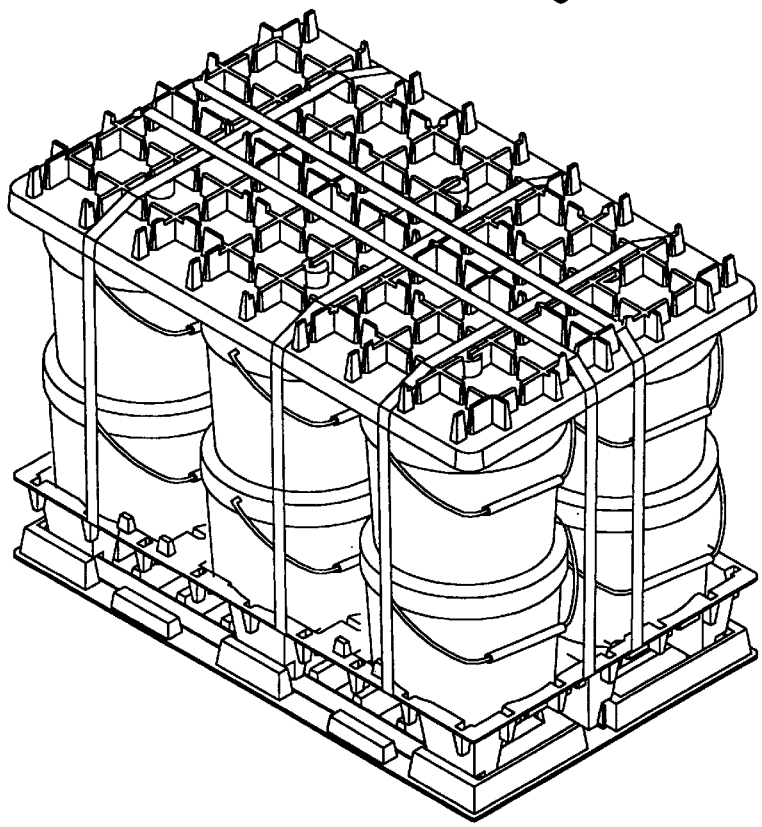
FIG. 6B shows a perspective view of a pallet assembly holding pails containing electrical wire.

FIGS. 6A and 6B show perspective views of a third embodiment of the pallet assembly 88. The pallet assembly 88 comprises a base 90 and a cover 92, which are substantially the same as the base 12 and the first layer cover 14 of the first embodiment. The third embodiment is designed to transport electrical wire packaged in boxes 94 and pails 96 and to allow for de-spooling directly off the pallet assembly 88.

As shown in FIG. 6A, the embodiment can accommodate a first 98 and a second layer 100 of boxes 94, 6 boxes 94 in each layer 98, 100. The ends of the boxes 94 comprising the first layer 98 are placed in the 6 depressions 102 in the top surface 104 of the base 90. The first layer cover 92 is disposed on the second layer boxes 100 such that locator bosses 106 engage holes in the top ends of the boxes 94. Bands 108 secure the pallet assembly 88 during shipment.

The third embodiment can also accommodate a first 110 and a second layer 112 of pails 96, 6 pails 96 in each layer 110, 112. The ends of the pails 96 comprising the first layer 110 are placed in the 6 depressions 102 in the top surface 104 of the base 90. The cover 92 is disposed on the second layer pails 112 such that the locator bosses 106 engage holes in the top ends of the pails 96. Bands 108 secure the pallet assembly 88 during shipment.

As mentioned, the boxes 94 and the pails 96 can be de-spooled directly off the pallet assembly 88. To de-spool, the user first removes the cover 92, and then withdraws wire from the holes located in top ends of the boxes 94 and the pails 96.

Figure 7:
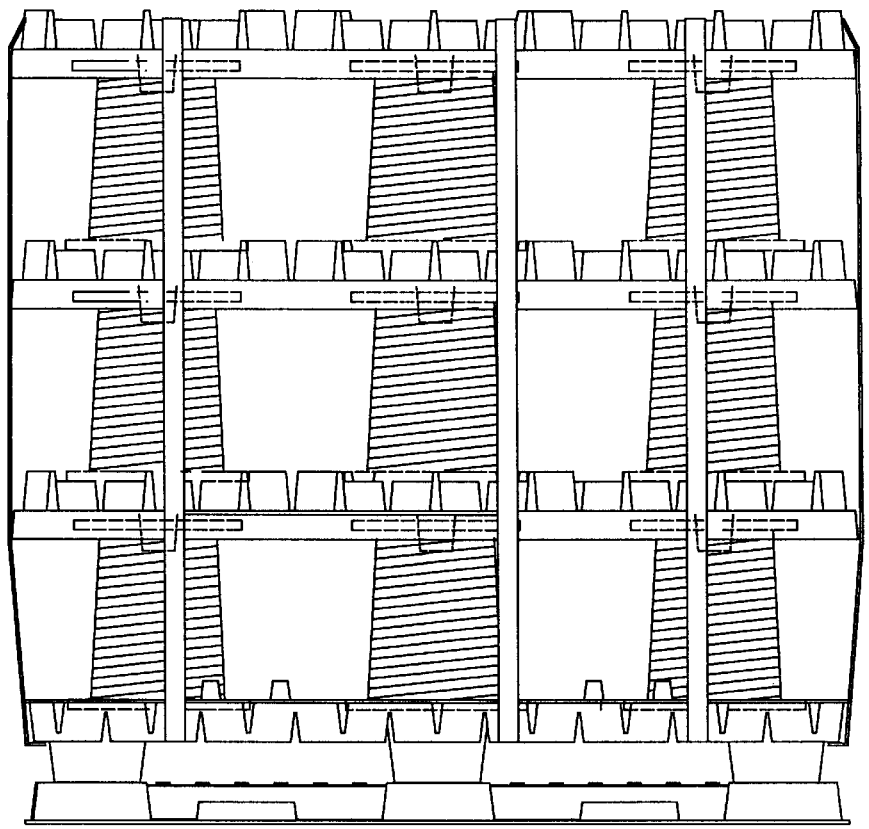
FIG. 7 shows a front view of a pallet assembly with separator panels holding reels of electrical wire.

A fourth embodiment is shown in FIG. 7. The pallet assembly 114 comprises a base 116, two separator panels 118, and an assembly cover 120, that are substantially similar to the base 12, the first layer cover 14, and the second layer cover 16, respectively, of the first embodiment.

Reels 122 are stacked in 3 layers 124 between the base 116 and the assembly cover 120, and the two separator panels 118 are disposed between the layers 124 of reels 122. The reels 122 are secured in depressions 126 on a top surface 128 of the base 116, and in receptacles 130 formed on a top surface 132 of each separator panel 118. Furthermore, the reels 122 are engaged by locator bosses 134, 136 on a bottom surface 138 of the assembly cover 120 and on a bottom surface 140 of each of the two separator panels 118, respectively. Bands 142 secure the pallet assembly 114 during shipment.

Preferred embodiments of the present invention have been disclosed. A person of ordinary skill in the art will realize, however, that certain modifications and alternative forms will come within the teachings of this invention. Therefore, the following claims should be studied to determine the true scope and content of the invention.

I claim:

1. A pallet assembly for transporting and de-spooling packages containing electrical wire, the assembly comprising:

a base having a top surface containing a plurality of depressions, each depression adapted to accommodate more than one package shape;

a first layer cover having a bottom surface, the bottom surface of the first layer cover disposed above the top surface of the base during transportation of the packages;

a plurality of locator bosses extending downward from the bottom surface of the first layer cover that are adapted to selectively engage the packages; and a de-spooling shroud that is adapted to at least partially surround the packages to prevent wire whipping during de-spooling of electrical wire.

2. The pallet assembly of claim 1, wherin the depressions on the top surface of the bade have discontinuous ad spaced apart arcuate portions and corner portions defining the perimeter of the depressions.

3. The pallet assembly of claim 1, wherein the de-spooling shroud is in the form of a tube.

4. The pallet assembly of claim 1, wherein:

the first layer cover further comprises a top surface, the top surface of the first layer cover having a plurality of depressions, each depression adapted to accommodate more than one package shape;

the pallet assembly further comprises a second layer cover having a bottom surface, the bottom surface of the second layer cover disposed above the top surface of the first layer during transportation of the packages; and a plurality of locator bosses extending downward from the bottom surface of the second layer cover that are adapted to selectively engage the packages.

5. The pallet assembly of claim 4, wherein the depressions on the top surface of the first layer cover have discontinuous and spaced apart arcuate portions and corner portions defining the perimeter of the depressions.

6. The pallet assembly of claim 4, wherein the second layer cover is substantially the same as the first layer cover.

7. The pallet assembly of claim 4, further comprising a de-spooling shroud that is adapted to at least partially surround the packages to prevent wire whipping during de-spooling of electrical wire.

8. The pallet assembly of claim 7, wherein the de-spooling shroud is in the form of a tube.

9. The pallet assemble of claim 1, wherein the first layer cover further comprises a top surface having a plurality of first and second projections extending upward, the first projections having a height greater than the second projections, and the first and second projections arranged to defined receptacles for receiving packages having more than one shape;

the pallet assembly further comprises a second layer cover having a bottom surface, the bottom surface of the second layer cover disposed above the top surface of the first layer during transportation of the packages; and a plurality of locator bosses extending downward from the bottom surface of the second layer cover that are adapted to selectively engage the packages.

10. The pallet assembly of claim 9, wherein the second layer cover is substantially the same as the first layer cover.

11. A pallet assembly for transporting and de-spooling electrical wire contained on reels, the assembly comprising:

a base having a top surface containing a plurality of depressions;

first layer de-spooling shrouds, each first layer de-spooling shroud in the form of a tube having a top end and a bottom end, the bottom end of each first layer de-spooling shroud inserted into the depressions on the top surface of the base; and a first layer cover, the first layer cover having a bottom surface, the bottom surface of the first layer cover disposed on the top end of each first layer de-spooling shroud;

wherein the intersection of the first layer de-spooling shrouds with the top surface of the base and the bottom surface of the first layer cover forms cavities for receiving the reels.

12. The pallet assembly of claim 11, wherein the depressions on the top surface of the base have discontinuous and spaced apart arcuate portions and corner portions defining the perimeter of the depressions.

13. The pallet assembly of claim 11, further comprising:

second layer de-spooling shrouds, each second layer de-spooling shroud in the form of a tube having a top end and a bottom end; and a second layer cover, the second layer cover having a bottom surface;

wherein the first layer cover further comprises a top surface, the top surface of the first layer cover having a plurality of depressions such that the bottom end of each second layer de-spooling shroud is inserted into the depressions on the top surface of the first layer cover;

the bottom surface of the second layer cover is disposed on the top end of each second layer de-spooling shroud; and the intersection of the second layer de-spooling shrouds with the top surface of the first layer cover and the bottom surface of the second layer cover forms cavities for receiving the reels.

14. The pallet assembly of claim 13, wherein the depressions on the top surface of the first layer cover have discontinuous and spaced apart arcuate portions and corner portions defining the perimeter of the depressions.

15. The pallet assembly of claim 13, wherein the second layer cover is substantially the same as the first layer cover.

16. The pallet assembly of claim 13, wherein the first layer de-spooling shrouds and the second layer de-spooling shrouds are substantially the same.

17. A pallet assembly for transporting and de-spooling packages containing electrical wire, the assembly comprising:

a base having a top surface containing a plurality of depressions, each depression having a periphery defined by alternating arcuate side walls and corners, wherein each of the corners comprises a pair of substantially planar surfaces converging at an angle less than 180 degrees;

an assembly cover having a bottom surface, the bottom surface having a plurality of locator bosses extending downward that are adapted to selectively engage the packages; and at least one separator panel having a top surface and a bottom surface, the top surface of the at least one separator panel containing a plurality of depressions, each depression adapted to accommodate more than one package shape, and the bottom surface of the at least one separator panel having a plurality of locator bosses extending downward that are adapted to selectively engage the packages;

wherein the at least one separator panel is disposed between the base and the assembly cover so as to transport more than one layer of packages.

18. The pallet assembly of claim 17, wherein the assembly cover is substantially the same as the separator panels.

19. The pallet assembly of claim 17, wherein the top surface of the separator panels further comprise a plurality of first and second projections extending upward, the first projections having a height greater than the second projections, and the first and second projections arranged to define the depressions for receiving packages having more than one shape.

20. The pallet assembly of claim 19, wherein the assembly cover is substantially the same as the separator panels.

21. A pallet assembly for transporting and de-spooling packages containing electrical wire, the assembly comprising:

a base having a top surface containing depressions, each of the depressions having a periphery defined by alternating arcuate side walls and corners, wherein each of the corners comprises a pair of substantially planar surfaces converging at an angle less than 180 degrees;

a first layer cover having a bottom surface, the bottom surface of the first layer cover disposed above the top surface of the base during transportation of the packages; and locator bosses extending downward from the bottom surface of the first layer cover that are adapted to selectively engage the packages.

22. The pallet assembly of claim 21, wherein:

the first layer cover further comprises a top surface, the top surface of the first layer cover having a plurality of depressions, each depression adapted to accommodate more than one package shape;

the pallet assembly further comprises a second layer cover having a bottom surface, the bottom surface of the second layer cover disposed above the top surface of the first layer during transportation of the packages; and a plurality of locator bosses extending downward from the bottom surface of the second layer cover that are adapted to selectively engage the packages.

23. The pallet assembly of claim 22, wherein each of the depressions on the top surface of the first layer cover have discontinuous and spaced apart arcuate portions and corner portions defining the perimeter of the depressions.

24. The pallet assembly of claim 22, wherein the second layer cover is substantially the same as the first layer cover.

25. The pallet assembly of claim 21, wherein the first layer cover further comprises a top surface having a plurality of first and second projections extending upward, the first projections having a height greater than the second projections, and the first and second projections arranged to define receptacles for receiving packages having more than one shape;

the pallet assembly further comprises a second layer cover having a bottom surface, the bottom surface of the second layer cover disposed above the top surface of the first layer during transportation of the packages; and a plurality of locator bosses extending downward from the bottom surface of the second layer cover that are adapted to selectively engage the packages.

26. The pallet assembly of claim 21, wherein the corners are arranged to define a polygonal shape.

27. The pallet assembly of claim 26, wherein the polygonal shape is a square.

* * * * *

UNITED STATES PATENT AND TRADEMARK OFFICE
CERTIFICATE OF CORRECTION

PATENT NO. : 5,974,981
DATED : November 2, 1999
INVENTOR(S) : Louis G. Ditton

It is certified that error appears in the above-identified patent and that said Letters Patent is hereby corrected as shown below:

Column 5, Line 60 (Claim 2, Line 2)

Replace "bade"
with --base--

Column 5, Line 60 (Claim 2, Line 2)

Replace "ad"
With --and--

Signed and Sealed this

Twentieth Day of June, 2000

Attest:

Q. TODD DICKINSON

Attesting Officer

Director of Patents and Trademarks